United States Patent [19]

Cheng

[11] Patent Number: 5,059,228
[45] Date of Patent: Oct. 22, 1991

[54] COOL THERMAL STORAGE AND/OR WATER PURIFICATION BY DIRECT CONTACT IN-SITU CRYSTAL FORMATION AND CRYSTAL MELTING OPERATIONS

[76] Inventor: Chen-Yen Cheng, 9605 La Playa St., NE., Albuquerque, N. Mex. 87111

[21] Appl. No.: 516,460

[22] Filed: Apr. 30, 1990

[51] Int. Cl.⁵ ............................................. B01D 9/04
[52] U.S. Cl. .......................................... 62/532; 62/12; 62/123
[58] Field of Search ..................... 62/12, 434, 59, 532, 62/123

[56] References Cited

U.S. PATENT DOCUMENTS

| | | | |
|---|---|---|---|
| 4,236,382 | 12/1980 | Cheng et al. | 62/537 |
| 4,505,728 | 3/1985 | Cheng et al. | 62/542 |
| 4,578,093 | 3/1986 | Cheng et al. | 62/532 |
| 4,650,507 | 3/1987 | Cheng et al. | 62/12 |
| 4,654,064 | 3/1987 | Cheng et al. | 62/532 |
| 4,810,274 | 3/1989 | Cheng et al. | 62/12 |

Primary Examiner—Ronald C. Capossela

[57] ABSTRACT

The present invention consists of processes and apparatuses for conducting thermal storage as well as thermal storage in combination with treatment of dilute waste water streams. In all cases, the ice or crystals are made at reduced pressure and do not leave the location where they are formed for washing or melting, but are fixed in one location, thus avoiding the difficulties associated with movement of solids. For cool storage, ice is made at off-peak power consumption hours and melted during on peak power consumption hours. Melting is accomplished at reduced pressure by flashing warm water into a zone which has vapor communication with the ice. The vapor formed condenses onto the ice to melt the ice. The warm water is chilled by the flashing operation and is sent to fulfill either a process or building cooling requirement. In combination with the treatment of dilute waste streams, ice is formed on slanted or vertical plates to the exclusion of solute impurities by having a large liquid flow over the plates. Crystallization is induced on the plates by evaporation at reduced pressures. The vapor formed is liquefied either by condensation at refrigerated coils followed by melting via direct contact with super-triple point vapor, by compression followed by condensation or by absorption. Ice is melted by the same method as for cool storage alone. The apparatus introduced includes the definition of zones required for the vacuum freezing, vapor liquefaction and ice melting zones as well as the valving means and heat exchangers required.

21 Claims, 7 Drawing Sheets

COOL THERMAL STORAGE AND/OR WATER PURIFICATION BY DIRECT CONTACT IN-SITU CRYSTAL FORMATION AND CRYSTAL MELTING OPERATIONS

BACKGROUND OF THE INVENTION

1. Field of Invention

The methods and apparatuses of the present invention are to be used in providing systems for cool thermal storage and/or water purification. The methods are based on solid-liquid-vapor multiple phase transformation operations for conducting direct contact in-situ crystal formation during a charging period and for conducting direct contact in-situ crystal melting operations during a discharging period. Chilled water is produced by coupling a water chilling operation with a crystal melting operation. The applications of the methods and apparatuses may be extended to non-aqueous systems.

The current market for cool thermal storage is created by electric utilities. The benefits derived by the utility may include increased revenue, lower cost production, or shifting summer demand. Electric utilities supplement persuasive marketing programs with attractive utility rates to sell the thermal storage concept. Many utilities will contribute cash rebates on the basis of "Avoided demand" for thermal storage systems.

Electric utilities generate power from several different energy sources with energy cost ranging from low cost hydro and nuclear to expensive gas turbines. Lower energy cost nuclear and hydro plants have excess capacity during off-peak hours (typically 9 pm to 9 am), while the cost of operating gas turbines for peaking often exceeds revenue from the power they generate. Lowering on-peak daytime demand and increasing off-peak nighttime demand enhances utility profitability. Load management just makes good economic sense. Cool thermal storage contributes to improved load management. The capital cost of cool thermal storage systems can be offset by utility savings passed on to the owner. The vehicle to pass on savings may be high daytime demand charges that are waived during off-peak hours, discounts for off-peak power or cash rebates for comfort systems that moves the power requirement from on-peak hours to off-peak hours.

A system of the present invention may serve as a dual purpose system for cool storage and water purification. It is particularly effective in treating dilute solutions. Polluted waters containing toxic pollutants in low concentrations are produced from various sources, such as underground waters, industrial waste waters and nuclear waste waters. Such waste water can be treated to produce usable water. A dual purpose system has tremendous advantages over conventional cool storage systems and conventional water purification systems.

2. Brief Description of the Prior Art

Since a dual purpose system of the present invention can provide both cool thermal storage and water purification, prior art on cool thermal storage and water purification by vacuum freezing are reviewed in the following:

2A. Cool Thermal Storage

Chilled water, ice or phase change materials can be used as a storage medium. Few phase change materials (other than water) have left the laboratory, and even fewer have met with any real success. For most comfort cooling applications, water is hard to beat as a storage medium. It is simply an economic question, "should water be cooled or frozen?"

CHILLED WATER STORAGE

Conceptually, chilled water storage appears to be the simpler design. However, as several details are analyzed, the advantages of ice storage become more appealing. Water stores heat by increasing its temperature. The specific heat of water is one Btu per degree Fahrenheit pound. 12,000 degree Fahrenheit pounds are required to store one tonhour of cooling. Maximizing the temperature rise of the system will reduce the mass of water required.

Chilled water storage is traditionally designed on a 20 degree Fahrenheit temperature rise, which equates to almost 10 cubic feet of water per tonhour. Chillers have very little difficulty cooling water to the minimum design temperature, typically 40° F. However, the cooling system may not be able to raise the stored water temperature by the full 20 degrees.

Chilled water at around 40° F. may be produced by absorption refrigeration or mechanical compression refrigeration. Major manufacturers of absorption refrigeration machines are Carrier Corporation of Syracuse, N.Y. and Trane Company of Le Crosse, Wis. Major manufacturers of mechanical compression water chillers are York Company of York, Pa. and Trane Company of Le Crosse, Wis. An absorption chiller usually uses a lithium bromide-water mixture as the working medium. A mechanical chiller uses a centrifugal compressor, screw compressor or reciprocating compressor and Freon as the refrigerant.

ICE STORAGE

The latent heat of fusion or the heat absorbed by one pound of ice when it melts is 144 Btu. This equates to less than 1.5 cubic feet of ice per tonhour. There are three types of conventional systems of ice storage. These three types are: (a) static ice storage, (b) dynamic ice storage and (c) slush ice storage. It will be shown that the present invention introduces a new and fourth type of ice storage system.

(a) Static Ice Storage Systems

In a static ice storage system, ice is made on tubes by an indirect freezing operation and is melted in place by circulating water to thereby produce chilled water for air conditioning. The volume of ice must be permeated with channels of fluid to transport heat into and out of the body of ice. The fluid in the pipe can be brine or refrigerant. Brine systems use ethylene glycol to transport heat into and out of the ice. Refrigerant systems circulate refrigerant through the pipe to remove heat from the tank, but circulate water through the free area around the ice when adding heat to the tank.

A major manufacturer of static ice storage systems is CALMAC Manufacturing Corporation of Englewood, N.J. CALMAC Corporation uses water chillers manufactured by Trane Company in its ice storage systems.

(b) Dynamic Ice Storage Systems

In a dynamic ice storage system, ice is produced by a flake ice machine and flake ice is stored in a vessel. A stream of circulating water is brought in contact with flake ice to be chilled and returned for cooling process equipment or a building. Major manufacturers of dynamic ice storage systems are Turbo Company in Denton, Tex. and Mueller Company in Springfield, Mo.

(c) Slushy Ice Storage Systems

In a slushy ice storage system, a slushy ice mixture is formed by an indirect freezing operation. A mass of slushy ice may be directly circulated for air conditioning or a water stream may be chilled by the slushy ice and used for air conditioning. Developers of slushy ice systems are Chicago Bridge and Iron Company in Chicago, Ill. and Sunwell Engineering Company in Canada.

It is noted that the processes and apparatuses of the present invention can be used to form ice and melt ice in-situ by solid-liquid-vapor multiple phase transformation operations and thereby provide a new type of ice storage system.

EUTECTIC SALTS

Eutectic describes a mixture of compound easily fused or fusing at the lowest possible temperature. The eutectic salt used in thermal storage applications is a salt hydrate that fuses at 47° F. In a crystalline form the salt fuses with several water molecules. In the amorphous form the salt disassociates from the water molecules, or "melts". Energy in the form of heat must be added to the hydrate to cause the disassociation.

The heat of fusion of this salt hydrate is 41 BTU per pound, compared to 144 Btu per pound for the heat of fusion of water or a sensible heat gain of 20 Btu per pound for chilled water storage. Eutectic salts can be used to store heat at a higher temperature than ice and lower volume than water.

The salt and water is packaged in plastic containers (approximately 8 inches by 24 inches by 1.75 inches). The container or "tray" is constructed with internal weight bearing supports and spacers to maintain vertical separation between the trays. The trays can be stacked in a chilled water storage tank to increase the capacity of the storage system. The tank design for a eutectic salt system must provide for uniform entrance velocity to the trays. The slow laminar flow into the tray section requires additional space for headers and supply diffusers. Transphase Systems, Incorporated of Huntington Beach, Calif. is a major supplier of eutectic cool storage systems.

It is noted that the process and apparatuses of the present invention can also be used to form hydrate crystals and decompose hydrate crystals in situ and thereby used as a new hydrate cool thermal storage system.

2B. Vacuum Freezing Processes

A vacuum freezing process can be used in the separation of both aqueous and non-aqueous solutions. Many vacuum freezing processes have been introduced by workers in the desalination field. Some of these processes have been tested in pilot plant scale operations.

Referring to the processing of an aqueous solution by any vacuum freezing process, the aqueous solution is introduced into a chamber which is maintained at a pressure that is somewhat lower than the vapor pressure of the solution at the freezing temperature of the solution to thereby simultaneously flash vaporize water and form ice crystals. This operation is referred to as S/L/V transformation in a vacuum freezing process. As the result of this operation, a low pressure water vapor, referred to as a first vapor, and an ice-mother liquor slurry, referred to as a first condensed mass, are formed. In the case of sea water desalination, this pressure is around 3.5 torr. The low pressure water vapor formed has to be removed and transformed into a condensed state; the ice crystals have to be separated from the mother liquor; the resulting purified ice has to be melted to yield fresh water. Furthermore, the heat released in transforming the vapor into a condensed state has to be utilized in supplying the heat needed in melting the ice. The processes to be described utilize different ways of vapor removal and different ways of accomplishing the heat reuse.

Several vacuum freezing processes have been introduced by workers in the desalination field. These processes are (1) Vacuum Freezing Vapor Compression (VFVC) Process, developed by Colt Industries, (2) Vacuum Freezing Vapor Absorption (VFVA) Process, developed by Carrier Corporation, (3) Vacuum Freezing Ejector Absorption (VFEA) Process, developed by Colt Industries, (4) Vacuum Freezing Solid Condensation (VFSC) Process developed in the Catholic University of America, (5) Absorption Freezing Vapor Compression (AFVC) Process, introduced by Concentration Specialists, Inc., (6) Vacuum Freezing High Pressure Ice Melting (VFPIM), introduced by Chen-Yen Cheng and Sing-Wang Cheng, and (7) Vacuum Freezing Multiple Phase Transformation Process, also introduced by Chen-Yen Cheng and Sing-Wang Cheng.

The Vacuum Freezing Vapor Compression Process is described in the Office of Saline Water, Research and Development Report No. 295. In the process, the low pressure water vapor is compressed to a pressure higher than the triple point pressure of water (4.58 Torr) and is then brought in direct contact with purified ice to thereby simultaneously condense the water vapor and melt the ice. The main disadvantages of this process are that the special compressor designed to compress the low pressure water vapor cannot be operated reliably, and the compressor efficiency is low.

The Vacuum Freezing Vapor Absorption Process was developed by Carrier Corporation up to 1964, but has been discontinued. The process is described in the Office of Saline Water, Research and Development Report No. 113. In the process, the low pressure water vapor is absorbed by a concentrated lithium bromide solution. The diluted solution is reconcentrated by evaporation and the water vapor so formed is condensed to become fresh water. Heat of absorption is removed by a recycling water stream through a heat transfer surface; the recycling water stream is then used to melt the ice crystals.

The Vacuum Freezing Ejector Absorption Process was also developed by Colt Industries, and is described in the Office of Saline Water, Research and Development Report No. 744. In the process, the low pressure water vapor obtained in the freezing step is compressed by a combination of steam ejector and absorber loop. A concentrated sodium hydroxide solution is used to absorb a part of the low pressure vapor; the diluted sodium hydroxide solution is boiled to form water vapor at 300 Torr, and is used to compress the remaining low pressure water vapor.

The Vacuum Freezing Solid Condensation Process was developed by Professors H. M. Curran and C. P. Howard of the Catholic University of America and is described in the Office of Saline Water, Research and Development Report No. 511. In the process, Freon-12 is used to remove the latent heat released in transforming the low pressure vapor into ice and supply the latent heat needed in the melting of both the ice formed in the freezing step and ice transformed form the low pressure water vapor.

The Absorption Freezing Vapor Compression (AFVC) Process was introduced by Concentration Specialists, Inc. of Andover, Mass. and a 25,000 gallons per day pilot plant has been built in the Office of Water Research and Technology Test Station in Wrightsville Beach. The Absorption Freezing Vapor Compression (AFVC) Process is a vacuum freezing process in which the freezing is accomplished in a stirred tank crystallizer due to the evaporation of water vapor which in turn is absorbed in an adjacent chamber by a concentrated solution of sodium chloride (NaCl). The NaCl solution, diluted by the water vapor, is pumped to a generator where it is concentrated to its original strength by a vapor compression cycle using a closed circuit refrigerant as the working fluid. The vapor compression cycle operated between the absorber and the generator, taking the heat that is associated with absorption and pumping it up to a level such that it can be used to evaporate the absorbant in the generator. The vapor liberated in the generator is used to melt the ice in direct contact.

It is noted that the first vapor is absorbed in the absorbing solution near the freezing temperature, and the heat of absorption is removed by vaporizing a refrigerant.

In the improved Vacuum Freezing High Pressure Ice Melting Process of U.S. Pat. No. 4,236,382, an aqueous solution is flash vaporized under a reduced pressure to simultaneously form a low pressure water vapor and ice crystals. The ice formed is first purified in a counter-washer and then melted inside of heat conductive conduits under high pressure (for example 600 atmosphere), and the low pressure water vapor is desublimed to form disublimate (ice) on the outside of the conduits. The latent heat of desublimation released is utilized in supplying the heat needed in the ice-melting operation. The desulimate is removed intermittently by an in-situ dissolution operation utilizing an aqueous solution such as the feed solution or the concentrate; about an equivalent amount of ice is formed inside of the conduits by an exchange freezing operation. The ice so formed is also melted by the high pressure ice melting operation described.

The Vacuum Freezing Multiple Phase Transformation Process has also been introduced by Chen-Yen Cheng and Sing-Wang Cheng and is described in U.S. Pat. No. 4,505,728. In the process, the first vapor is liquefied by desublimation followed by desublimate melting.

BRIEF DESCRIPTION OF THE INVENTION

The present invention introduces processes and apparatuses for providing three new types of systems for cool thermal storage, respectively referred to as Type A systems, Type B systems and Type C systems. A Type A system is a single purpose ice storage system; a Type B system is a dual purpose system which provides both cool storage and water purification; a Type C system is a single purpose hydrate storage system.

A Type A system comprises three major processing zones: there are a first processing zone (Z-1), a second processing zone (Z-2) and a third processing zone (Z-3). The first processing zone is compartmentized into a multitude of thin compartments, each storing a mass of water and is provided with vapor passages so that each thin compartment is in vapor communication with the second and third processing zones. Each thin layer of water in Zone 1 may be retained on a shallow tray or be retained inside of a sponge by capillary force. The second processing zone is a zone in which a first vapor, $V_{12}$, whose pressure is lower than the triple point pressure of water, is transformed into a condensed mass. The third processing zone is a zone in which a water stream $M_{03}$ is flash vaporized to form a second vapor whose pressure is higher than the triple point pressure of water and a chilled water stream, $M_{30}$.

The system is operated cyclically and each cycle has a charging period and a discharging period. During a charging period, the pressure in the first processing zone is reduced below the triple point pressure to thereby generate a first vapor whose pressure is lower than the triple point pressure of water and produce a mass of ice in-situ. The first vapor may be generated by vaporization at the liquid/vapor interface and/or by sublimation at the solid/liquid interface. The ice formed in each thin compartment is stored within the compartment in which it is formed. The pressure in the zone is maintained by transferring vapor to the second processing zone. The first vapor is transformed into a condensed phase mass, usually a liquid mass.

During a discharging period, a stream of water to be chilled $M_{03}$ is introduced into the third processing zone and is flash vaporized to form a second vapor, $V_{31}$, whose pressure is somewhat higher than the triple point pressure of water and produce a stream of chilled water. The chilled water is used for process cooling or building cooling. The second vapor flows into the first processing zone to melt he ice in situ.

Since the ice is formed in-situ, stored in-situ and melted in-situ, there is no need to transfer ice. It is also noted that in a Type A system, there is substantially no need to move liquid in the first processing zone. During a charge period, ice is formed in zone 1 as the first vapor flows from zone 1 to zone 2; during a discharge period, ice in zone 1 is melted as the second vapor flows from zone 3 to zone 1.

For a large cool storage system, one may have several vessels, each containing a first processing zone, sharing a common second processing zone and a common third processing zone. One may also have several vessels, each containing a first processing and a third processing zone, sharing one common second processing zone.

The construction and operations of a Type C system is similar to those of a Type A system except for the following:

(a) A mixture of water and a hydrate-forming agent is placed in each thin compartment;
(b) A mass of hydrate crystals is formed and decomposed during a charging period and a discharging period, respectively;
(c) The first vapor is at a pressure higher than the triple point pressure and is transformed into a liquid mass by a simple condensation operation.

The construction and operation of a Type B system are different from those of a type A system as follows:

(1) Vertical plates or slanted plates are placed with close spacing in zone 1.
(2) During a charging period, water to be treated is applied on each plate as a thin liquid film. Simultaneous vaporization and solidification cause formation of a first vapor and a mass of smooth ice.
(3) During a discharging period, second vapor gets in contact with the smooth ice deposit to melt it band thereby produce purified water.

It is noted that a Type B system has great ecnomical advantage, because the equipment provides cool storage for process cooling and air conditioning and produces purified water at the same time.

Figure 1:
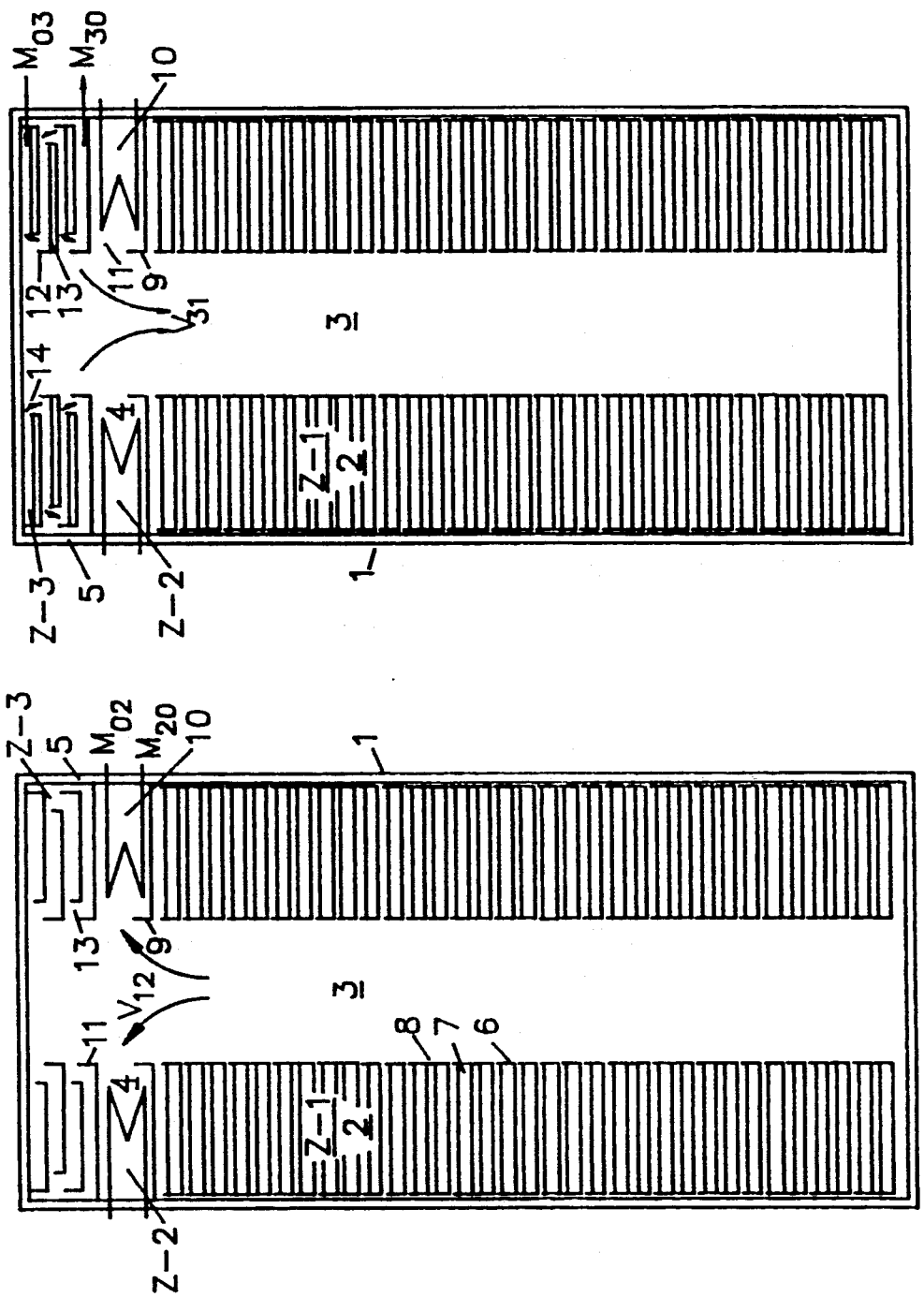
FIGS. 1A and 1B respectively illustrate a Type A system during a charging period and a discharging period. There are a first processing zone (Zone 1) and a second processing zone (Zone 2) and a third processing zone (Zone 3). There are thin compartments in Zone 1 retaining a layer of water. During a charging period, each layer of water is transformed into a first vapor and ice; the first vapor is transformed into a condensed mass in Zone 2. During a discharging period, a mass of water is flash vaporized in Zone 3 to form a second vapor and a mass of chilled water; the second vapor is brought in contact with ice in Zone 1 to melt the ice.

The system illustrated by FIGs. 1A and 1B can also be used as a Type C system for hydrate storage. Operational procedures are similar to those of a Type A system.

Figure 2:
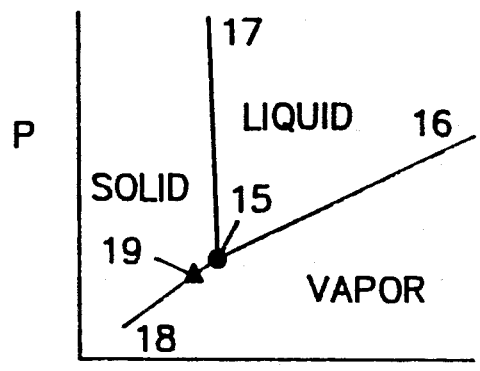

FIG. 2 illustrates the phase diagram for the water system. The operating conditions of a Type A system and a Type B system are illustrated in this figure.

Figures 3A, 3B:
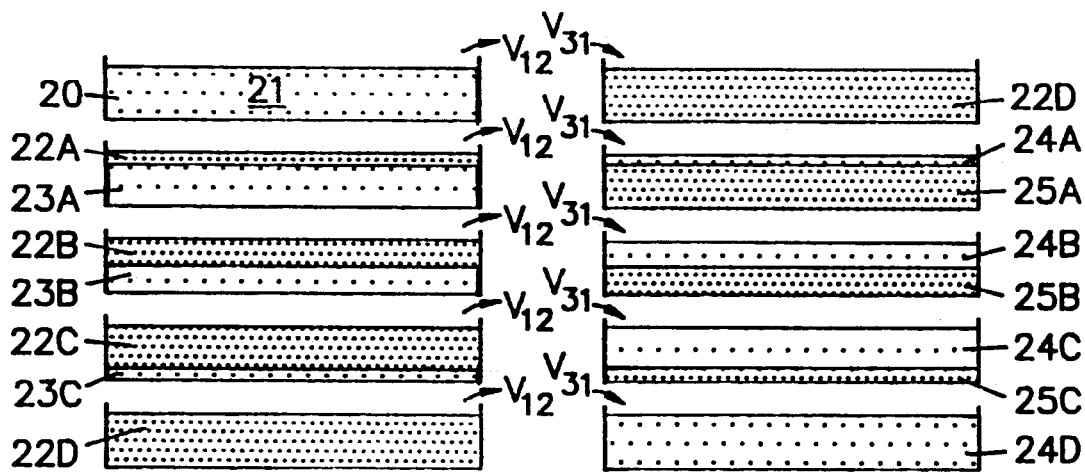
Figures 4A, 4B:
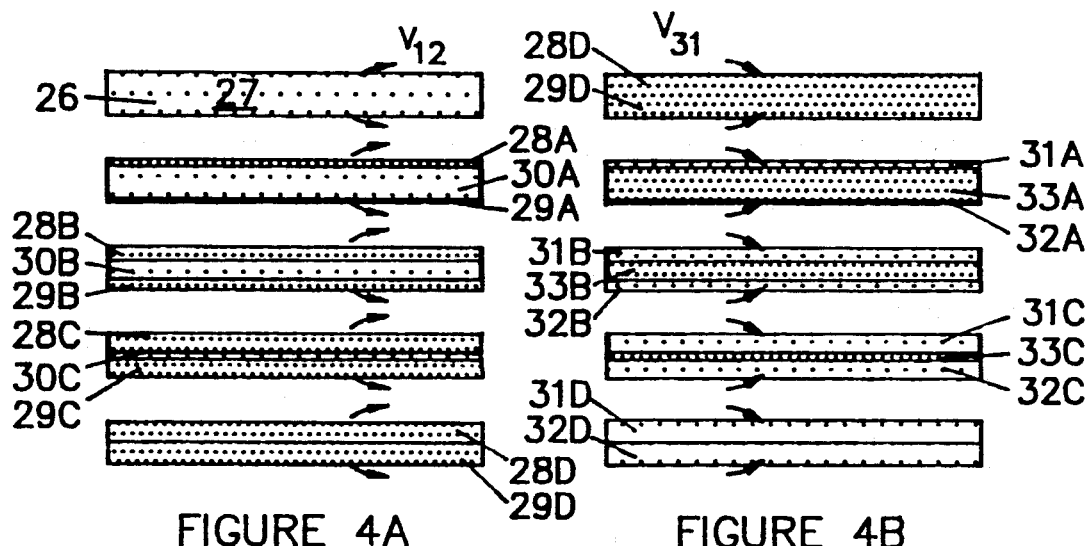

FIGS. 3A and 3B illustrate charging and discharging operations of a thin water layer retained on a tray in Zone 1 of a Type A system; FIGS. 4A and 4B illustrate charging and discharging operations of a layer of water retained in a thin layer of sponge in Zone 1 of a Type A system.

Figure 5A:
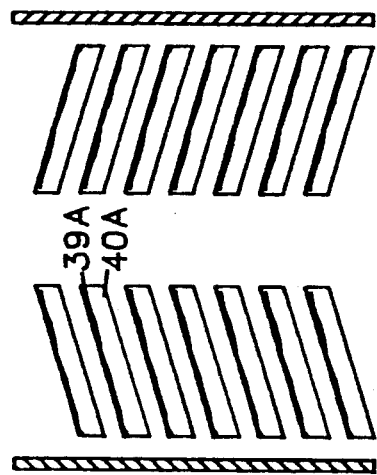
Figure 6A:
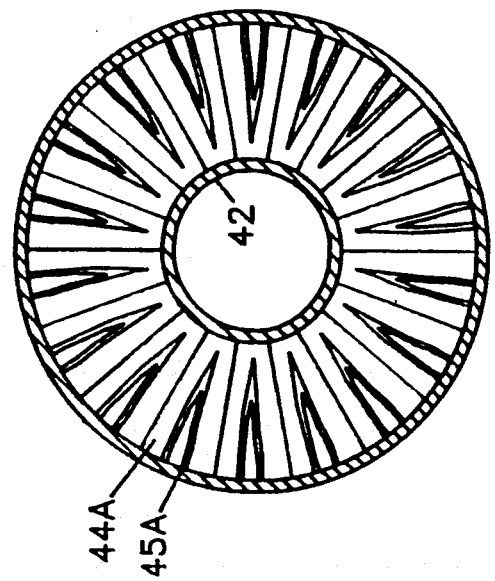
Figure 5B:
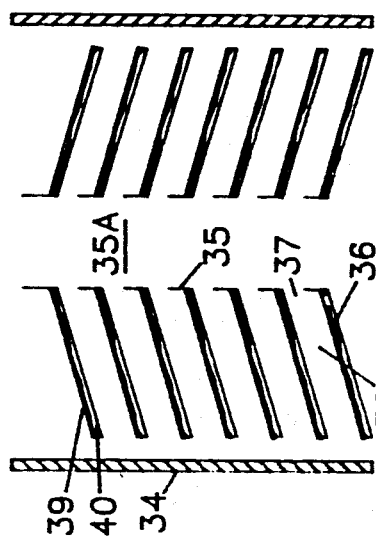
Figure 6B:
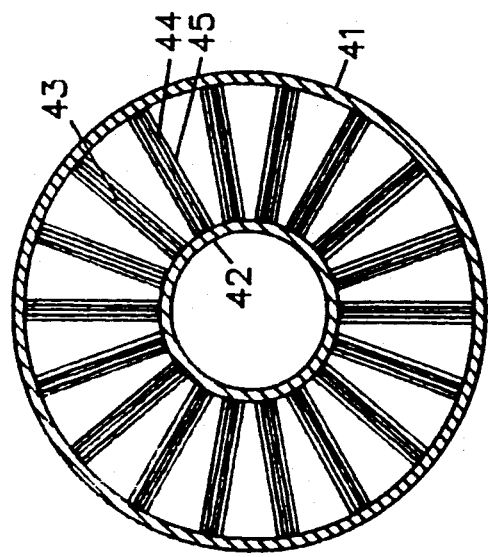

FIGS. 5A and 5B illustrate the structure of a Type B system in which slanted plates are placed at some spacing in Zone 1. The figures also illustrate the progress of the operation in a charging period. FIGS. 6A and 6B illustrate the structure of a Type B system in which vertical plates are placed in a radial direction in Zone 1. The figures also illustrate the progress in operation in a charging period.

Figure 7:
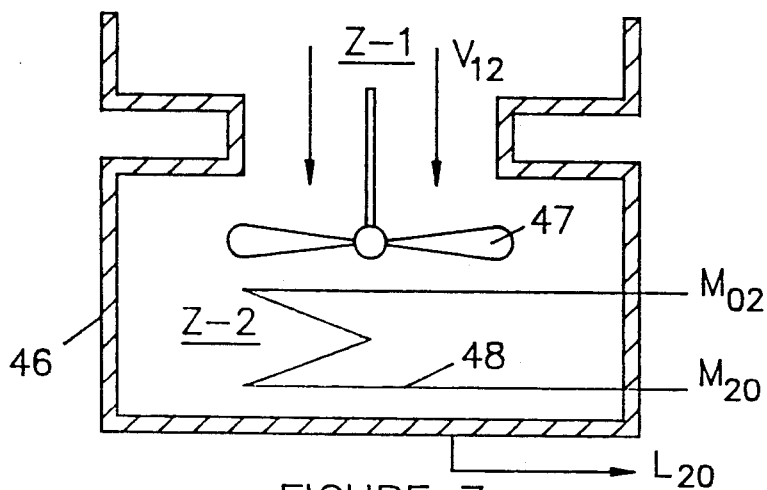
Figure 8:
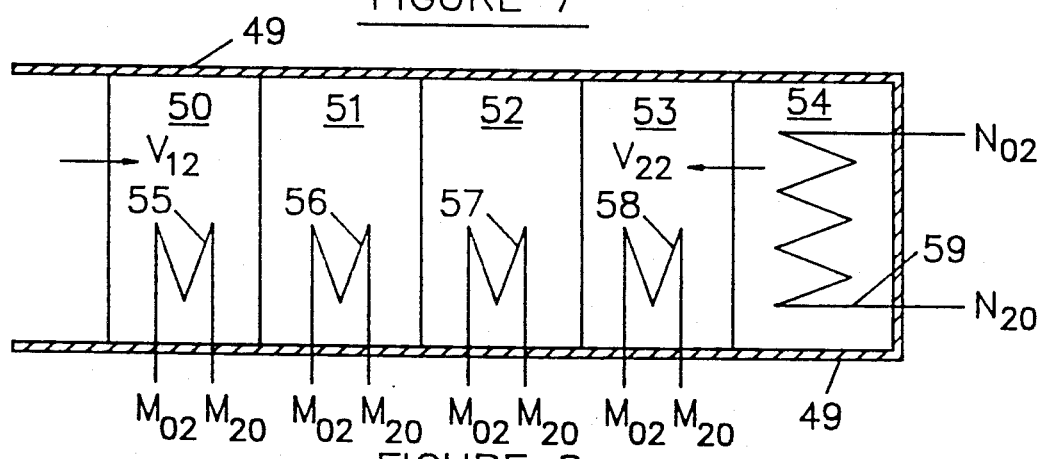
Figure 9:
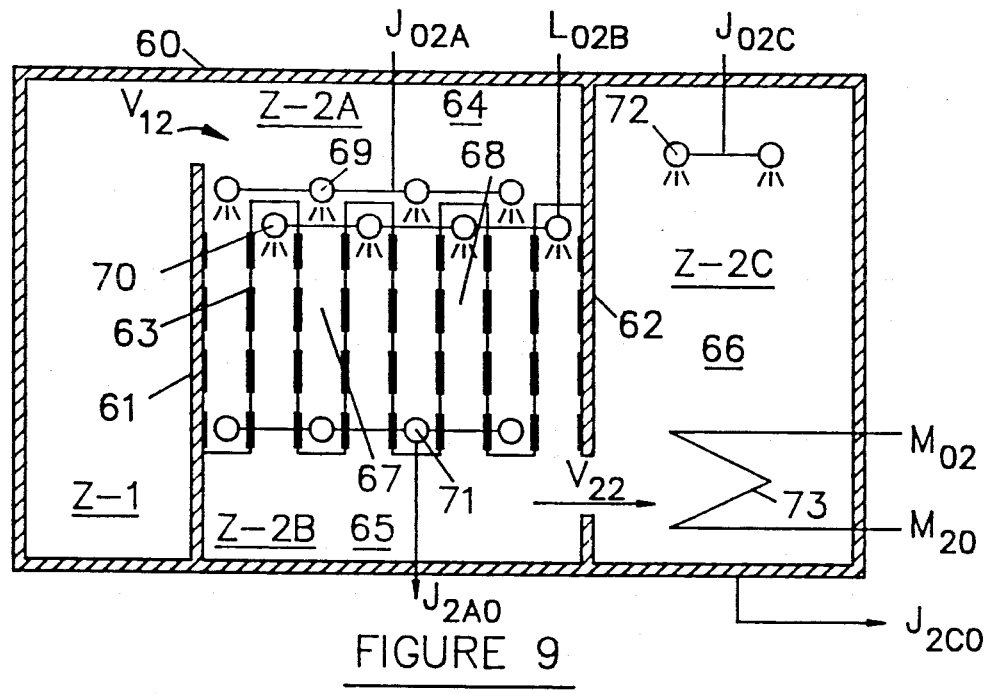
Figure 10:
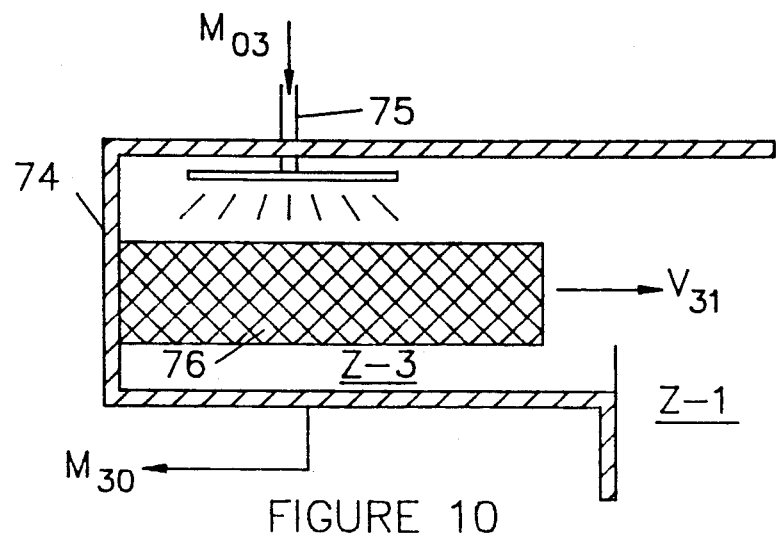
Figure 11:
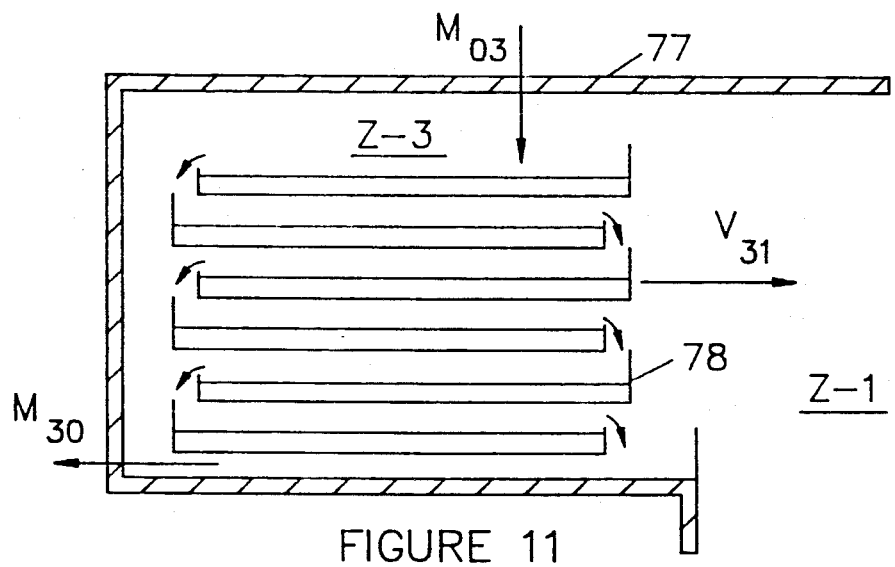
Figure 12:
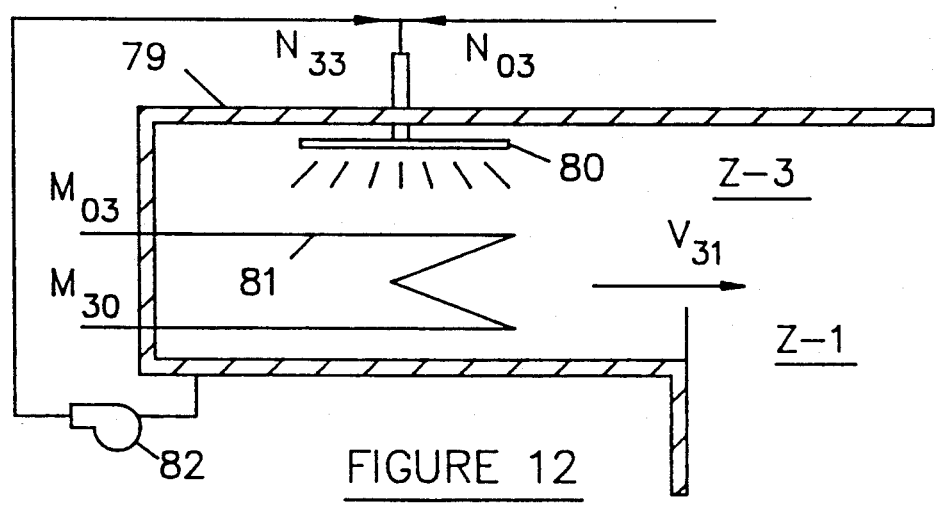

FIGS. 7, 8 and 9 illustrate various ways of transforming first vapors into liquid masses; FIGS. 10, 11 and 12 illustrate various ways of flash vaporizing water to produce second vapor streams and chilled water streams.

Figure 13:
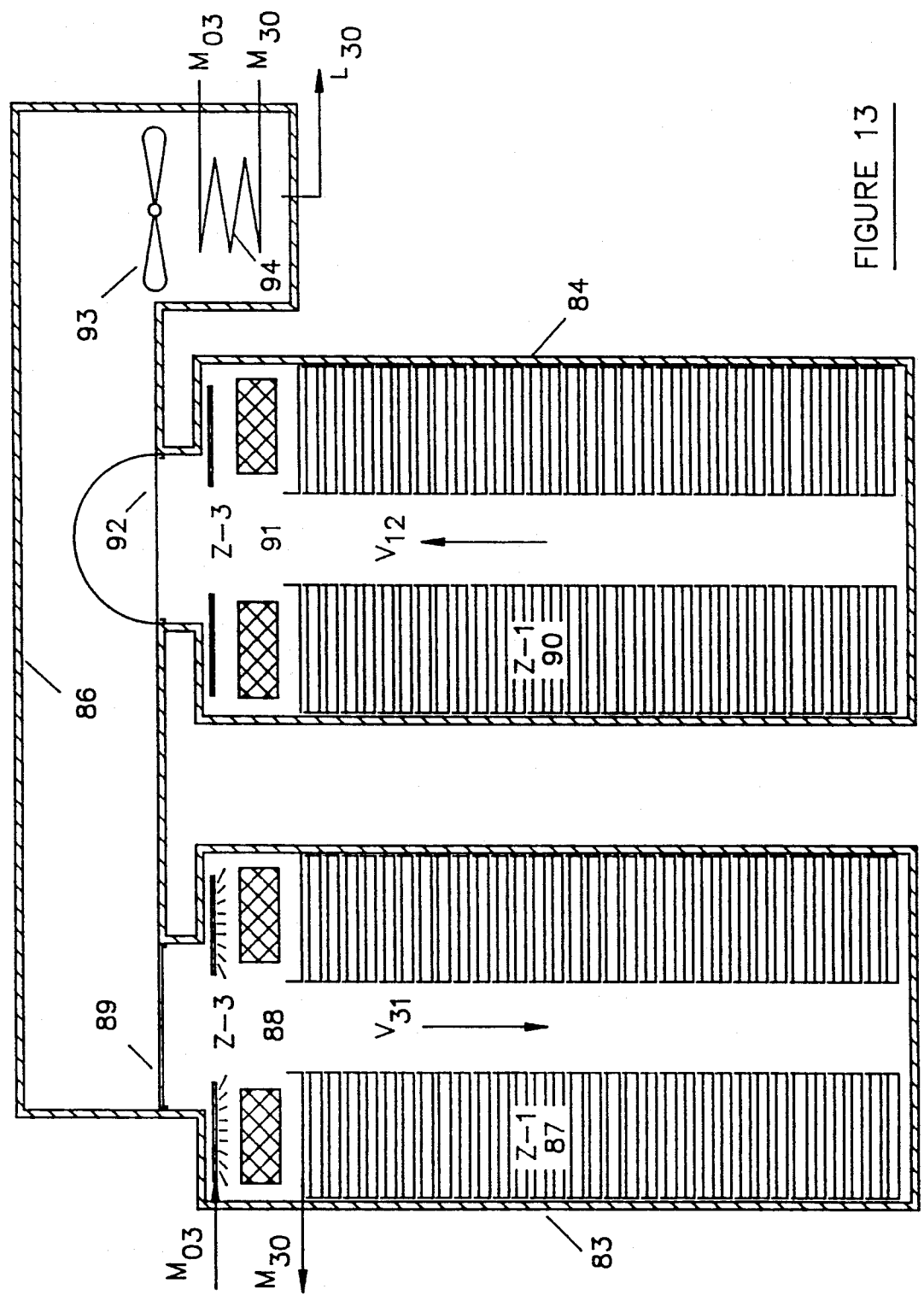
Figure 14:
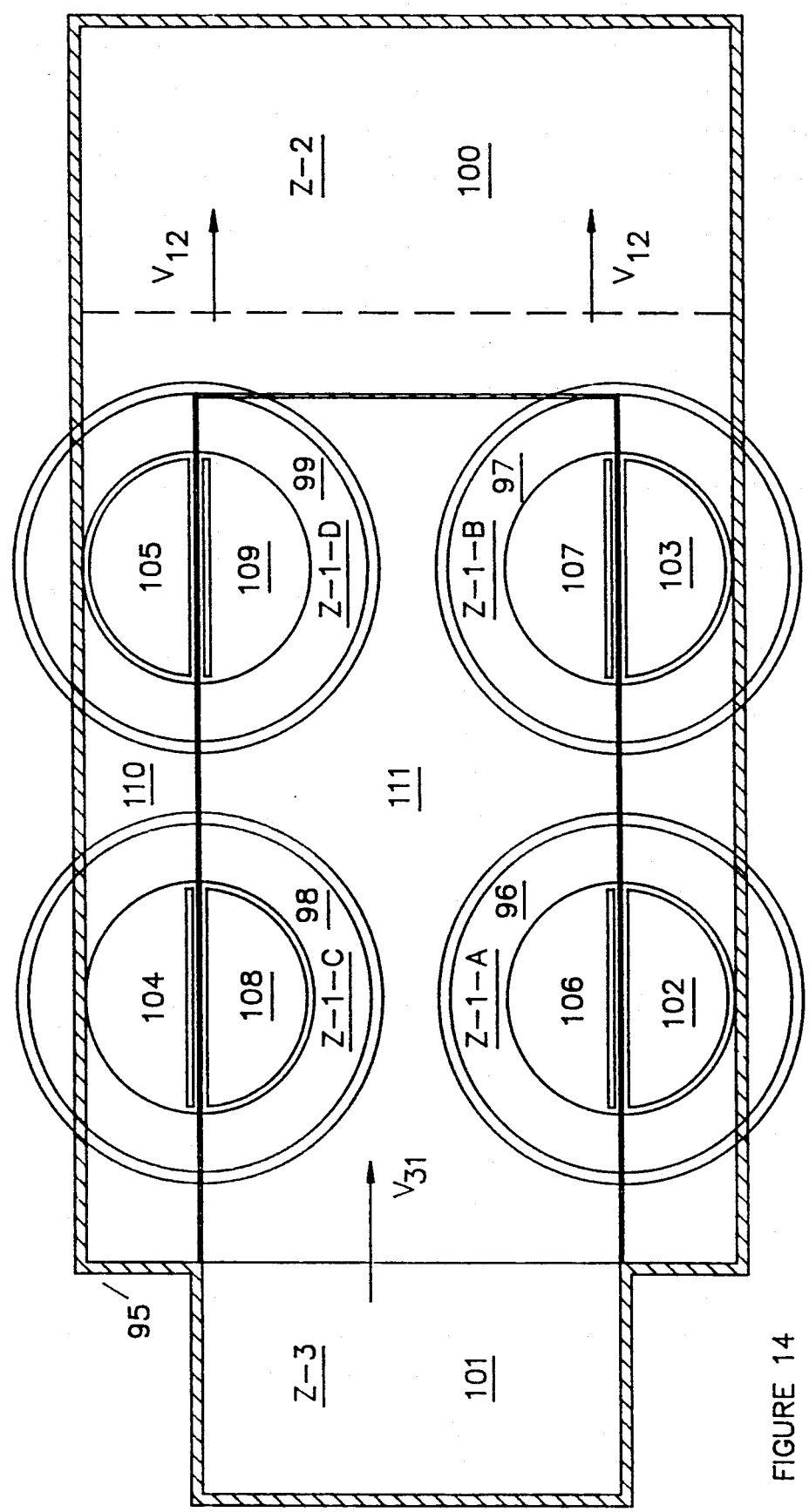

FIG. 13 illustrates an integrated system comprising two or more vessels, each containing a first processing zone and a third processing zone, and a common second processing zone. FIG. 14 illustrates an integrated system comprising four vessels, each containing a first processing zone, and a common second processing zone and a common third processing zone. With proper valve arrangement, each vessel can undergo a charging operation and a discharging operation.

PREFERRED EMBODIMENT OF THE INVENTION

The present invention introduces three new types of systems for cool thermal storage, respectively referred to as Type A systems, Type B systems and Type C systems. A Type A system is a single purpose ice storage system; a Type B system is a dual purpose system which provides both cool storage and water purification; a Type C system is a single purpose hydrate storage system.

FIGS. 1A and 1B illustrate a Type A system. FIG. 1A illustrates a condition during a charging period; FIG. 1B illustrates a condition during a discharging period. The system has a vacuum vessel 1 and comprises a first processing zone 2 (Zone 1), a main vapor passage 3, a second processing zone 4 (Zone 2), and a third processing zone 5 (Zone 3). Zone 1 is compartmentized by shallow trays 6. A mass of water 7, is retained on each tray. There is a small gap 8 between two neighboring trays that provides a vapor passage. Therefore, water on each tray is in vapor communication with Zone 2 and Zone 3. Referring to FIG. 1A, a first vapor $V_{12}$ is generated in Zone 1 during a charging period; referring to FIG. 1B, a second vapor $V_{31}$ enters the thin compartment in Zone 1 during a discharging period. Zone 2 is a zone in which first vapor is transformed into a condensed state during a charging period. Zone 3 is a zone in which water $M_{03}$ is flash vaporized to generate second vapor $V_{31}$ and a stream of chilled water $M_{30}$. In Zone 2, there is a partitioning wall 9, a set of heat exchangers 10 and an opening 11 allowing the first vapor to enter the zone. In Zone 3, there are trays 12 on which water 13 forms a cascading stream and flash vaporizes to form second vapor. The second vapor leaves the zone through opening 14.

FIG. 2 illustrates the pressure temperature diagram for water. It shows the triple point 15 (32° F., 4.58 torr), a vaporization line 15–16, a melting line 15–17, and a sublimation line 15–18. The solid region, the liquid region and the vapor region are shown in the figure. During a charging period, a first vapor is produced by sublimation from the ice surface under a condition illustrated by point 19. During a discharging period, ice is melted under a condition close to the triple point 15.

FIG. 3A illustrates the progress of a charging operating taking place in a thin water layer within a shallow tray 20. At the beginning of the charging operation, the entire layer is liquid water 21. First vapor is formed by the vaporization of water and the top region of the water layer is supercooled and forms a layer of ice 22A on the top of a liquid layer 23A. Once an ice layer is formed, the liquid layer is covered by the ice layer. When the pressure 19 is lower than the triple point pressure 15, sublimation takes place, thereby continues to form a first vapor and supercool the ice layer. The supercooling causes ice to form at the water/ice interface, which is the bottom surface of the ice layer. Sublimation and ice formation continue. Therefore, the ice layer grows as illustrated by 22A, 22B, 22C and 22D, and the water layer diminishes as illustrated by 23A, 23B, 23C and disappears. Since the first vapor is produced mainly by sublimation, its pressure 19 is lower than the triple point pressure. Therefore, the first vapor is referred to as a sub-triple point vapor. The first vapor has to be removed from the first processing zone and be transformed into a liquid mass. Several ways of transforming the first vapor will be described later by referring to FIGS. 7, 8, 9.

FIG. 3B illustrates the progress of a discharging operation that takes place in a thin water layer. Assuming that at the beginning of a discharging operation the entire layer is ice 22D. As a second vapor $V_{31}$ is brought in contact with the ice layer, the top layer is melted to form a thin liquid layer 24A leaving an ice layer 25A at the bottom. As the discharging operation progresses, the liquid layer becomes thicker as shown by 24A, 24B, 24C and 24D and the ice layer diminishes as shown by 25A, 25B, 25C and disappears. The operating pressure during a discharging operation is somewhat higher than the triple point pressure.

The amount of water on a tray is reduced during a charging period due to the formation of the first vapor and is increased during a discharging operation due to the condensation of the second vapor on the water layer. Therefore the amount of water on a tray remains substantially unchanged after each cycle.

One may use thin layers of sponge to retain thin layers of water in Zone 1. When thin layers of sponge are used, vaporization and sublimation take place both from the top surface and bottom surface during a charging period and condensation of second vapor can also take place both on the top surface and bottom surface. FIG. 4A illustrates the progress of a charging period. It shows that initially a thin layer of sponge 26 is filled with liquid water 27. As the charging operation progresses, a top layer of ice is formed and grows in thickness as shown by 28A, 28B, 28C and 28D, a bottom layer of ice is formed and grows in thickness as shown by 29A, 29B, 29C and 29D, and the water layer diminishes as shown by 30A, 30B, 30C and disappears. FIG. 4B illustrates the progress of a discharging period. It shows that the entire layer is filled with ice at the beginning. As the discharging operation progresses, ice is melted both from the top and bottom to form a top liquid layer and a bottom liquid layer. The top liquid layer increases in thickness as shown by 31A, 31B, 31C, and 31D; the bottom liquid layer also increases in thickness as shown by 32A, 32B, 32C and 32D; the ice layer diminshes as shown by 33A, 33B, 33C and disappears.

In summary, the system is operated cyclically and each cycle has a charging period and a discharging period. During a charging period, the following two steps take place respectively in Zone 1 and Zone 2:

STEP 1

Generation of First Vapor and In-Situ Ice Formation

When the pressure in the first processing zone is reduced below the triple point pressure, a first vapor, whose pressure is lower than the triple point pressure (4.58 torr), is generated and a mass of ice is formed in situ. The first vapor may be generated at the liquid/vapor interface by vaporization or be generated at a solid/vapor interface by sublimation. The ice formed in each compartment is stored within the compartment in which it is formed. The pressure in the zone is maintained by removing water vapor form the zone.

STEP 2

Transforming the First Vapor into a Condensed Mass

The first vapor formed in Step 1 flows to the second processing zone, where it is transformed into a condensed mass by one or more of the following operations: (a) an absorption operation, (b) an adsorption operation, (c) desublimation on a chilled organic fluid, and (d) a two step desublimation and desublimate melting operation. During the discharging period, the following two steps take place respectively in Zone 3 and Zone 1:

STEP 3

Production of Chilled Water and Second Vapor

A stream of water to be chilled $M_{03}$ is introduced into the third processing zone and is flash vaporized therein to produce chilled water $M_{30}$ and form a second vapor $V_{31}$ whose pressure is higher than the triple point pressure. The chilled water produced is used for air conditioning and/or for process cooling.

STEP 4

In Situ Melting of Ice

The second vapor generated in the third processing zone is brought in contact with the ice stored in the first processing zone to thereby simultaneously condense the second vapor and melt the ice in-situ.

The system illustrated by FIGS. 1A and 1B can also be used as a Type C system for hydrate storage. Many organic and inorganic compounds form hydrate crystals. Formation of hydrates is described in physical chemistry and phase rule books, for example, chapter 7 of the following book:

"The Phase Rule and Heterogeneous Equilibrium" by John E. Ricci. Published by Van Norstrand in 1951 and by Dover Publishing Company in 1966.

There are congruently melting hydrates and incongruently melting hydrates with freezing curves available for both. When a solution at a given concentration is cooled below the hydrate freezing temperature, hydrate crystals are formed. When a mixture of hydrate crystals and mother liquor is heated above the freezing temperature, the hydrate crystals decompose and become a liquid. In a Type C system a mass of mixture containing water and a hydrate forming solute is placed in the thin compartments in Zone 1. During a charging period, a cooling medium is introduced in Zone 2 to draw vapor from Zone 1. The pressure in Zone 1 is thereby reduced to cause water to vaporize and cool the mixture below its hydrate forming temperature. A first vapor is formed and hydrate crystals are produced. During a discharging period, water to be chilled is flash vaporized in Zone 3 to form a second vapor at a second pressure and thereby produce a stream of chilled water. The second vapor is absorbed into the solution in the thin compartments of Zone 1 to decompose the hydrate crystals. The operating temperatures and pressures are respectively higher than those of Type A systems. A simple chiller can be used in Zone 2 to provide the cooling needed in the zone.

A Type B system is a dual purpose system in which both cool storage and water purification are accomplished. The major differences between a Type B system and a Type A system are in the structures used inside of Zone 1 and operations conducted within Zone 1. In a Type A system water is retained within thin compartments and remain stationary except for slight movements associated with freezing and melting operations. In a Type B system a stream of water to be purified flows over the ice surface to promote diffusion of impurities away from the solid-liquid interface. Two types of structures used are illustrated by FIGS. 5 and 6. The first type of structure is referred by as a slanted plate structure and a unit using this type of structure is referred to as a slanted plate unit; the second type of structure is referred to as a radial vertical plate structure and a unit using this type of structure is referred to as a radial vertical plate unit.

FIGS. 5A and 5B illustrates the structure of a slanted plate unit and also illustrate the progress in a charging period. The unit has a vertical vacuum vessel 34, a central distribution tube 35 enclosing a fluid passage 35a, a multitude of slanted plates 36, and a multitude of slots 37 for introducing water to be treated into the slanted spaces 38.

During a charging period, water vaporizes from the flowing water film 39 and is supercooled. Ice is formed from the supercooled liquid film to form a layer of ice 40 on the slanted plate surface. The position of the flowing liquid film moves upward as the ice layer thickness increases. A rather thick layer of ice may be formed without reducing the rate of forming ice. This is because the latent heat released in the formation of ice is transmitted through the liquid film and is utilized in supplying the latent heat of vaporization.

FIG. 5B shows that a rather thick layer of ice 40A has been formed while a liquid film 39A continues to flow on its surface. The first vapor formed flows to Zone 2 and is transformed into a condensed mass in a way similar to that in a Type A system. Due to the flow of water to be treated over the ice surface, solutes in the water are transferred away from the ice/water interface as ice is formed. Therefore, the ice formed is purer than the original water. The unfrozen liquid becomes a concentrated solution and is discharged from the system.

During a discharging period, water to be chilled $M_{03}$ is introduced into Zone 3 and cooling in Zone 2 is stopped. The water $M_{03}$ flash vaporizes to form a second vapor and the rest of the water becomes a stream of chilled water $M_{30}$. The second vapor flows and comes in contact with the top surface of the ice layers. Simultaneous condensation of the second vapor and melting of ice takes place to form a purified water stream which is a combined stream of the condensate of the second vapor and melt of the ice.

FIGS. 6A and 6B illustrate the structure of a radial vertical plate unit and also illustrate the progress in a charging period. The unit has a vertical vacuum vessel 41, a central tube 42, a multitude of radial and vertical plates 43 held on the central tube, a multitude of distributors (not shown in the drawing) to distribute water to be treated onto the vertical surfaces. The figures show that a layer of ice 44 is formed from a flowing liquid film 45 and the ice layer becomes rather thick 44A toward the end of a charging period. The operations in this unit are the same as those described in the slanted plate unit.

The first vapor formed in Zone 1 of any of the Type A, Type B and Type C systems have to be transformed into a liquid mass in Zone 2 so that it can be transported away from the zone. Since the first vapor formed in a Type C system is a super-triple-point vapor, the desired transformation can be accomplished by a simple condensation operation. However, the first vapor formed in either a Type A system or a Type B system is a sub-triple point vapor which forms solid (desublimate) on cooling surfaces. Therefore, a more elaborate method has to be used in the transformation. Three methods are illustrated in FIGS. 7, 8 and 9.

The unit illustrated by FIG. 7 has a vacuum enclosure 46, a low pressure vapor compressor 47 and a cooling unit 48. In operation, a first and sub-triple point vapor $V_{12}$ is compressed from a sub-triple point pressure to a super-triple point pressure and is condensed by the cooler to become a liquid stream $L_{20}$. A cooling medium $M_{02}$ enters the cooler, heated and discharged as $M_{20}$. The unit illustrated by FIG. 8 transforms a first and sub-triple point vapor into a liquid stream by a two step operation involving desublimation and desublimate melting operations. The unit has a vacuum enclosure 49, four condensing compartments 50, 51, 52 and 53 and a super-triple point vapor generating compartment 54. The condensing compartments have cooling units 55, 56, 57 and 58 therein, and each compartment has a first vapor valve (not shown) and a super-triple point vapor valve (not shown). In the super-triple point vapor generation compartment, there is a heating coil 59 and a water spraying device (not shown). In operation, cooling medium is introduced into the cooling coils of three condensing compartments with the first vapor valves open and the super-triple point vapor valves closed for these three compartments to allow the first vapor to enter and to be desublimed in these three compartments. Heating fluid $N_{02}$ is introduced into the heating coil in the super-triple point vapor generating compartment and is discharged as $N_{20}$ and water is sprayed on the heating coil to generate super-triple point vapor. The super-triple point vapor valve and the first vapor valve of the remaining condensing compartment are respectively open and closed to admit super-triple point vapor and melt the desublimate. The melt of the desublimate becomes the desired transformed liquid mass.

The unit illustrated by FIG. 9 accomplishes the desired transformation by two stage absorption operations. The unit has a vacuum enclosure 60, partitioning walls 61, 62, 63 to separate the unit into Zone 1, Zone 2A 64, Zone 2B 65 and Zone 2C 66. Thin vertical compartments 67 in Zone 2A, thin vertical compartments 68 in Zone 2B, spraying means 69 for spraying absorbing solution $J_{02A}$ on walls of the thin vertical compartments in Zone 2A, spraying means 70 for spraying water on the walls of the thin vertical compartments in Zone 2B, manifolds 71 for discharging diluted absorbing solution $J_{02A}$ from Zone 2A, spraying means 72 for spraying another absorbing solution $J_{02C}$ and an opening for discharging diluted absorbing solution $J_{2CO}$ from Zone 2C.

In operation a first and sub-triple point vapor formed in Zone 1 is absorbed into the absorbing solution $J_{02A}$ so that the absorbing temperature is lifted above the pure water saturation temperature corresponding to the absorption pressure. The heat generated in the absorption operation is transmitted to water in Zone 2B to generate water vapor $V_{22}$ at a super-triple point pressure. The super-triple point vapor so generated is absorbed into the other absorbing solution $J_{02C}$ with the heat of absorption removed by a heat transfer medium $M_{02}$, $M_{20}$. The first vapor is absorbed into the first absorbing solution to become a part of the diluted first absorbing solution.

It has been described that during a discharging period, a water stream is flash vaporized in Zone 3 to produce a second vapor stream $V_{31}$ and a chilled water stream. FIGS. 10, 11, and 12 illustrate three ways of accomplishing this function.

FIG. 10 illustrates a direct spray unit which has a vacuum enclosure 74, a spray device 75 and a packed bed 76. When the unit is maintained under a proper pressure somewhat higher than the triple point pressure and a water stream $M_{03}$ to be chilled is sprayed on the packed bed, water flash vaporizes to produce a second vapor $V_{31}$ and a stream of chilled water $M_{30}$. The chilled water $M_{36}$ is used for process cooling and/or building cooling and returned with makeup water. The second vapor formed is used to melt ice or hydrate crystals in Zone 1.

FIG. 11 illustrates a cascade unit which has a vacuum enclosure 77 and several staggered trays 78. Water to be chilled $M_{03}$ flows downward through the trays, flash vaporizes to form second vapor and a chilled water stream $M_{30}$.

FIG. 12 illustrates an indirect spray unit. It has a vacuum enclosure 79, a spraying device 80, and a heat exchange coil 81. There are two water streams M and N involved in an operation of the unit. A water stream $N_{03}$ and a recycle stream $N_{33}$ are combined and sprayed on the heat exchange coil. Water flash vaporizes from the combined stream to produce a second vapor $V_{31}$ and a chilled water stream. An external water stream $M_{03}$ flows inside of the heat exchanger coil and is cooled by the chilled water outside of the coil to become another chilled water stream $M_{30}$, which is used for process cooling and/or building cooling.

It is economically advantageous to have several processing units, each unit containing a first processing zone and a third processing zone to share one common second processing zone by making a proper valve arrangement for each unit. It is also advantageous to have several units, each unit containing a first processing zone to share one common second processing zone and one common third processing zone by making a proper valve arrangement for each unit.

FIG. 13 illustrates a system in which there are two processing vessels 83 and 84 sharing one common second processing zone 85. The first processing unit has a first processing zone 87 and a third processing zone 88 and a valve 89. The second processing vessel has a first processing zone 90, a third processing zone 91 and a valve 92. In the second zone, there is a low pressure vapor compressor 93 and a heat removal coil 94 with cooling medium $M_{03}/M_{30}$ flowing through it. As shown in the figure, the second vessel is in a charging period and the first vessel is in a discharging period.

Valve 89 of the first vessel is closed; water to be chilled $M_{02}$ is flash vaporized to generate a second vapor and produce a chilled water stream $M_{20}$. Valve 92 of the second vessel is open, water to Zone 3 91 is stopped. Water in the thin compartments of Zone 1 of the second vessel is vaporized to produce a first vapor and a mass of ice. The first vapor is compressed by the compressor 93 and is condensed to become a condensate $L_{30}$.

FIG. 14 illustrates an integrated system having four cool storage vessels each containing a first processing zone. The four vessels share one common and external second processing zone and one common and external third processing zone. The system has a distribution vessel 95, four cool storage vessels 96, 97, 98, 99, a common second processing zone 100 and a common third processing zone 101. The four cool storage vessels each have a first vapor valve 102, 103, 104, 105 to control vapor communication between the vessels and the second processing zone and a second vapor valve 106, 107, 108, 109 to control vapor communication between the vessels and the common third processing zone. There is a passage for first vapor 110 and a passage for second vapor 111. Each cool storage vessel can be subjected to a charging operation or a discharging operation by properly opening and closing its first vapor valve and its second vapor valve. The operations of this integrated unit is similar to those of a single vessel unit described above.

In conclusion, the following remarks are presented:

(1) Since a system of the present invention is to be used for cool storage, a charging period may cover the entire off-peak hours and a discharging period may cover the entire on-peak hours. Therefore, the charging period may be as long as 12 hours. However, for claiming purposes, it is only needed to distinguish it from a separation process by freezing. For this purpose, it may be stated that the charging period is greater than ten minutes. One may also set the lower limits to be more than 30 minutes or one hour in order to establish a clear distinction from any prior art process.

(2) In the specification presented and the claims to be presented, "direct contact" is used to mean that there is no metallic layer separating the heat source where heat is generated by crystal formation and the heat sink where heat is removed by vaporization of liquid.

(3) In a Type B system, the heat released at the ice/liquid interface is transmitted only through the flowing liquid film on the ice surface. Therefore, the thickness of ice formed does not substantially reduce heat transfer rate unless the vapor passages become blocked. Therefore, one may form an ice layer several inches in thickness.

(4) In a Type A system, heat released in the ice formation region is transmitted through the ice layer to the sublimation region. Therefore, the thickness of the ice layer does affect heat transfer rate. However, since the area available for sublimation and ice formation in Zone 1 are so large, the rate of heat transfer required per unit area is rather small. Therefore, one may grow ice up to one or two inches in thickness. The lower bound of the thickness of ice to be made in a Type A system is about 0.25 inches.

What are claimed are as follows:

1. A process of subjecting an aqueous liquid to a freezing operation to thereby form a mass of crystals of a first compound that contain water molecules therein and produce a mass of chilled water in a processing system; a first processing zone (zone 1), a second processing zone (zone 2) and a third processing zone (zone 3), the first processing zone containing a crystal holding means provided with openings to provide vapor flow passages and provide an extensive interfacial area between solid and vapor or between solid and liquid, the second processing zone containing heat transfer means for removing heat from a vapor stream, the third processing zone containing means for providing an extensive liquid-vapor interfacial area, characterized in conducting cyclic operations in zone 1 and each cycle comprises a charging period of direct contact in-situ crystal formation operation and a discharging period of direct contact in-situ crystal melting operation; the operations conducted during a charging period comprises the following steps:

step 1: generation of first vapor and in-situ crystal formation: a mass of the aqueous liquid is placed in zone 1, and the pressure in the zone is reduced to thereby form a first vapor and a mass of crystals of the first compound, the pressure in the zone being maintained by removing the first vapor from the zone and the crystal formed being retained by the crystal holding structure;

step 2: transforming the first vapor into a condensed mass: the first vapor formed in step 1 is transformed into a condensed mass by an operation that comprises a heat removal operation;

the operation conducted during a discharging period comprise the following steps;

step 3: production of chilled water and second vapor; a stream of water is introduced into the third processing zone and is provided with an extensive liquid/vapor interfacial area and is thereby flash vaporized to produce a stream of chilled water and form a second vapor;

step 4: in-situ crystal melting: the second vapor formed in step 3 is brought in heat exchange relation with the mass of crystals of the first compound produced in step 1 and being held by the crystal holding structure in zone 1 to thereby transform the second vapor into a mass of liquid and melt the mass of crystals.

2. A process of claim 1, wherein the mass of crystals of the first compound formed is ice.

3. A process of claim 1, wherein the mass of crystals of the first compound formed is a hydrate.

4. A process of claim 1, wherein the charging period in a cycle is longer than ten minutes.

5. A process of claim 1, wherein the charging period in a cycle is longer than thirty minutes.

6. A process of claim 1, wherein the charging period in a cycle is longer than one hour.

7. A process of claim 1, wherein the first processing zone is compartmentized into thin compartments closely spaced with gaps, the gaps providing vapor passages.

8. A process of claim 1, wherein the first processing zone is compartmentized into thin compartments and each compartment being provided with means of holding a liquid mass by capillary force.

9. A process of claim 2, wherein the aqueous liquid processed in the first processing zone is an aqueous solution containing one or more solutes and is to be purified, and the liquid is applied on the ice surface during a charging period to enhance mass transfer of solute(s) away from the ice/liquid interface, the melt formed during a discharging period becoming purified water.

10. A process of claim 9, wherein the thickness of ice formed is greater than 0.25 inches.

11. An apparatus for subjecting an aqueous liquid to a freezing operation to thereby form a mass of crystals of a first compound that contains water molecules therein and produce a mass of chilled water that contains a first processing zone (zone 1), a second processing zone (zone 2) and a third processing zone (zone 3) that comprise (a) a vacuum vessel that contains the three processing zones;

(b) a crystal holding structure in zone 1 that divides the zone into multiple processing sub-zones, thereby providing an extensive solid/vapor and/or liquid/vapor interfacial area and provide vapor flow passages;

(c) heat transfer equipment in zone 2 to remove heat from a vapor stream to thereby transform the vapor into a condensed mass;

(d) an equipment for providing an extensive liquid-vapor interfacial area to a liquid stream in zone 3;

(e) a main vapor passage that establishes vapor communications between the first processing zone and the second processing zone and between the first processing zone and the third processing zone; characterized in that the apparatus is operable in cycles and each cycle comprises a charging period of direct contact in-situ crystal formation operation and a discharging period of direct contact in-situ crystal melting operations and the operations conducted during a charging period comprises the following steps:

step 1: generation of first vapor and in-situ crystal formation: a mass of the aqueous liquid is placed in zone 1, and the pressure in the zone is reduced to thereby form a first vapor and a mass of crystals of the first compound, the pressure in the zone being maintained by removing the first vapor from the zone and the crystal formed being retained by the crystal holding structure;

step 2. transforming the first vapor into a condensed mass the first vapor formed in step 1 is transformed into a condensed mass by an operation that comprises a heat removal operation;

and the operations conducted during a discharging period comprises the following steps:

step 3: production of chilled water and second vapor a stream of water is introduced into the third processing zone and is provided with an extensive liquid/vapor interfacial area and is thereby flash vaporized to produce a stream of chilled water and form a second vapor;

step 4: in-situ crystal melting: the second vapor formed in step 3 is brought in heat exchange relation with the mass of crystals of the first compound produced in step 1 and being held by the crystal holding structure in zone 1 to thereby transform the second vapor into a mass of liquid and melt the mass of crystals.

12. An apparatus of claim 11, wherein the crystal holding structure in zone 1 comprises a multitude of shallow trays.

13. An apparatus of claim 11, wherein the crystal holding structure in zone 1 comprises a multitude of thin layer structures and each layer structure holds a mass of the aqueous liquid by capillary force.

14. An apparatus of claim 11, wherein the crystal holding structure comprises a multitude of slanted plates.

15. An apparatus of claim 11, wherein the crystal holding structure comprises a multitude of vertical plates.

16. An apparatus of claim 11, wherein the heat transfer equipment in zone 2 comprises a vapor compressor that raises the pressure of the first vapor from a pressure lower than the triple point pressure of water to a pressure higher than the triple point pressure of water and a condenser condensing the pressurized first vapor.

17. An apparatus of claim 11, wherein the heat transfer equipment in zone 2 comprises two or more first vapor condensers and a vapor generator that generates a vapor whose pressure is higher than the triple point pressure of water, and a first vapor valve and super-triple point vapor valve for each first vapor condenser.

18. An apparatus of claim 11, wherein the heat transfer equipment in zone 2, comprises an absorbing equipment for absorbing the first vapor.

19. An apparatus of claim 11, wherein the equipment placed in zone 3, comprise a packed bed and a liquid distributor.

20. An apparatus of claim 11, wherein the equipment placed in zone 3 comprises a heat exchanger coil, an internal liquid distributor, thereby and internal liquid is flash vaporized to produce a chilled internal liquid and a second vapor and an external liquid is cooled by passing through the heat exchanger and be cooled by the chilled internal liquid to become an external chilled liquid.

21. An apparatus of claim 11, wherein the equipment placed in zone 3 comprises multiple trays so that during a discharging period, a water stream to be chilled flows through the trays and is provided with an extensive liquid-vapor interface area.

* * * * *